July 31, 1962 J. F. WALTON 3,047,814

BRIDGE-TYPE DIRECT-COUPLED AMPLIFIER

Filed Nov. 28, 1958

2 Sheets-Sheet 1

INVENTOR
JOHN F. WALTON

BY Harness & Rose

ATTORNEYS

July 31, 1962 J. F. WALTON 3,047,814

BRIDGE-TYPE DIRECT-COUPLED AMPLIFIER

Filed Nov. 28, 1958 2 Sheets-Sheet 2

INVENTOR

JOHN F. WALTON

BY Hurvitz & Rose

ATTORNEYS 3,047,814

BRIDGE-TYPE DIRECT-COUPLED AMPLIFIER

John F. Walton, Arlington, Va., assignor to Elcor, Inc., Falls Church, Va., a corporation of Virginia Filed Nov. 28, 1958, Ser. No. 777,033
22 Claims. (Cl. 330—40)

The present invention relates to direct-coupled amplifiers and more particularly to a bridge-type, direct-coupled amplifier having a substantially linear response to signals of frequencies from zero to several megacycles per second.

The direct-coupled amplifier circuit of the present invention is rendered practical by utilization of a special power supply having an exceedingly low shunt capacity to ground. The special power supply, which has a capacity to ground of the order of magnitude of 20 micro-micro-farads is the subject of copending patent application, Serial No. 683,740, filed by John F. Walton and John Reaves on September 13, 1957, and entitled Isolated Power Supply. The exceedingly low shunt capacity of the power supply disclosed in the aforesaid pending application permits the supply to be connected between the anode of a tube and the anode load impedance without producing serious signal degradation, due to shunting of the anode load resistor by the capacity of the supply. Even at signal frequencies of several megacycles per second, the shunt capacity of the power supply presents a capacitive reactance of several thousand ohms and by appropriately choosing other circuit parameters, the signal degradation due to the shunt capacity of the supply may be maintained at quite a small and acceptable value.

The circuit described above is particularly useful as a direct-coupled amplifier since the direct component of the voltage across the load resistor may be made so low that the signal across the resistor may be coupled directly to the grid of a succeeding amplifier tube without requiring the interposition of voltage dropping resistors or blocking capacitors. However, when the circuit described above is employed as a direct-coupled amplifier, and voltage dropping resistors are not utilized, the biases available for the bute in the next stage of amplification are quite limited in range. Further, the amplifier is subject to other problems encountered in direct-coupled amplifier circuits; such as, zero drift and variations in gain due to supply voltage variations, and heater current variations and tube aging if tubes are employed and temperature variations if transistors are employed.

In accordance with the present invention, the aforesaid power supply is employed in a bridge-type, direct-coupled amplifier in which the power supply is connected across the two legs of a bridge circuit. One leg of the bridge is employed as a signal amplifier and the other leg is employed as a voltage divider. In one embodiment of the invention, one of the aforesaid power supplies is connected between the anode of a tube and its anode load resistor which has its end remote from the supply grounded. The cathode of the tube is connected to ground through a cathode resistor and its control grid is connected to a source of signals. A resistive voltage divider is connected across the voltage source and forms one leg of the bridge while the tube, its cathode resistor and anode load form the other leg of the bridge. The output signal is taken from the bridge between ground and a point on the voltage divider which is at ground potential in the absence of input signals. This latter point may be varied along the voltage divider so as to obtain any direct voltage available along the divider and therefore a wide range of biases is available for the next stage of amplification.

One advantage of the bridge circuit is that the signals developed across the load resistor are not attenuated by the voltage divider. This result is contrary to the attenuation of signals affected by the voltage divider networks employed in other direct-coupled amplifier circuits.

An additional advantage to the circuit of the invention over other circuits requiring voltage dropping resistors, is that the variation in the value of one of the impedances in the voltage divider circuit does not have a disproportionately large effect upon the signal amplitude. In many direct-coupled circuits, voltage divider resistors are employed to obtain a relatively large direct voltage that subtracts from the relatively large quiescent anode voltage of the amplifier tube to obtain a relatively small difference voltage on the grid of the succeeding amplifier tube. In consequence, the output voltage level is more sensitive to changes in the value of the voltage divider resistors than to changes in the value of the anode load resistor. In the circuit of the invention a change in the value of the voltage dividing resistors has only the same effect as a change in the impedance of the elements of the voltage amplifying circuit.

Still another advantage of the bridge circuit of the present invention is that it is relatively insensitive to supply voltage variations. However, the circuit is still sensitive to tube aging and heater supply voltage or in the case of transistors to temperature changes.

In accordance with another embodiment of the invention each leg of the bridge is a series circuit including a triode, having its anode connected to the positive terminal of the power supply; a cathode resistor; and a further resistor having one end connected to the cathode resistor and the other end connected to the negative terminal of the power supply. The tubes in both legs of the bridge are identical and preferably constitute the two halves of a dual triode, while the corresponding resistors in the two legs of the bridge have identical resistance values. One leg of the bridge is employed as a signal amplifying circuit while the other leg of the bridge is employed as a voltage divider for compensating for cathode emission changes in the amplifier tube. The junction of the resistors in the signal-amplifying arm of the bridge is connected to ground and constitutes one input terminal and also one output terminal of the bridge. The input signals to the bridge are applied between ground and the grid of the tube in the signal arm of the bridge. The further resistor in the signal-amplifying arm of the bridge constitutes the load impedance of the circuit, while the corresponding resistor in the divider arm of the bridge is employed as a balancing resistor. One of the output terminals of the bridge is ground, and the junction of the balancing resistor and the cathode resistor in the divider arm of the bridge constitutes the other output voltage terminal of the circuit. The grid of the tube in the divider arm of the bridge is connected to the later terminal.

The circuit thus constituted has a number of unique features. Specifically, one end of the load resistor may be connected to ground, which is an asset in many circuits. Further, the value of the various resistors and the impedances of the tubes employed in the circuit may readily be chosen such that the bridge is balanced in the absence of input signals and therefore the ungrounded output voltage terminal may be at ground potential or at other voltages determined by the values of the resistors in the divider leg of the bridge.

The utilization of the bridge circuit is also of importance in compensating for variations in the performance of the tubes. If two sections of a tube in a common envelope are employed, the cathodes are heated by the same heater so that heater current variations affect both legs of the bridge the same. Also, the tubes age substantially in the same manner and the effect of emitter variations are partially compensated.

The bridge-type, direct-coupled amplifier of the invention may be cascaded with other amplifier stages either different from or identical to the amplifier of the present invention, since the output terminal of the bridge may be held at ground potential or other desired bias voltage in the absence of an input signal. A distinct advantage arises from the utilization of identical cascaded stages of the bridge type described above particularly with regard to negative feedback. Consider only the signal legs of the bridges of two cascaded stages of the amplifier of the present invention. The non-signal current flowing through the signal legs is identical regardless of the order of the two stages in the cascaded circuit. By connecting a resistor between the cathode resistor and ground in the signal leg of the first bridge in the cascaded circuit and connecting this same resistor between the load resistor and ground in the signal leg of the second stage of the cascaded amplifier, a feedback circuit is developed having no direct potential developed therein. More particularly the currents in the two arms of the two distinct bridge circuits are in opposite directions through the feedback resistor and the direct current in each of the signal arms of the two bridge circuits is equal to that of the other so that the net direct voltage developed across the resistor is zero. However, due to the fact that the signal currents in the second stage of the cascaded amplifier are an amplified version of the signal currents developed in the first stage of the amplifier, there is a differential signal current in the feedback resistor and therefore a feedback signal is developed.

It is an object of the present invention to provide a bridge-type direct-coupled amplifier circuit having two output terminals one of which may be connected to ground.

It is yet another object of the present invention to provide a bridge-type, direct-coupled amplifier circuit employing a power supply having neither output terminals grounded.

Still another object of the present invention is to provide a bridge-type direct-coupled amplifier circuit which is compensated for variations in temperature of the heater element of the tube employed in the circuit.

It is still another object of the present invention to provide a bridge-type, direct-coupled amplifier circuit employing a voltage dividing network which does not attenuate signal voltages but does effect a transposition in the direct potential of the signals.

Yet another object of the present invention is to provide a bridge-type, direct-coupled amplifier circuit in which one output terminal may be grounded, and in which a second output terminal is at ground potential in the absence of an input signal to the circuit.

Another object of the present invention is to provide a bridge-type, direct-coupled amplifier circuit in which variations in the impedance of elements employed as direct current dropping impedances have the same effect upon signal amplitudes as variations in the impedances in the signal carrying elements of the circuit.

It is still another object of the present invention to provide a cascaded direct-coupled amplifier employing as individual stages bridge-type, direct-coupled amplifier circuits in which a feedback circuit between the various stages of the cascaded amplifier stages is provided which carries zero direct current with no input signal and which does not require capacitors or transformers to eliminate direct current in the feedback path.

The above and still furuther objects, features and advantages of the present invention will become apparent upon consideration of the following detailed description of several embodiment thereof, especially when taken in conjunction with the accompanying drawings, wherein:

FIGURE 1 of the accompanying drawings is a schematic circuit diagram of one embodiment of the amplifier of the present invention;

FIGURE 2 of the accompanying drawings is a schematic wiring diagram of another embodiment of the invention;

FIGURE 3 of the accompanying drawings is a schematic wiring diagram of an embodiment of the present invention utilizing high frequency compensation;

FIGURE 4 is a schematic wiring diagram of an embodiment of the invention employing transistors;

FIGURE 5 of the accompanying drawings is a schematic circuit diagram of a cascaded amplifier arrangement employing the individual amplifier stages of the present invention;

FIGURE 6 of the accompanying drawings discloses a cascaded amplifier employing negative feedback between various stages thereof;

Figures 1, 2, 3, 4, 5, 6:
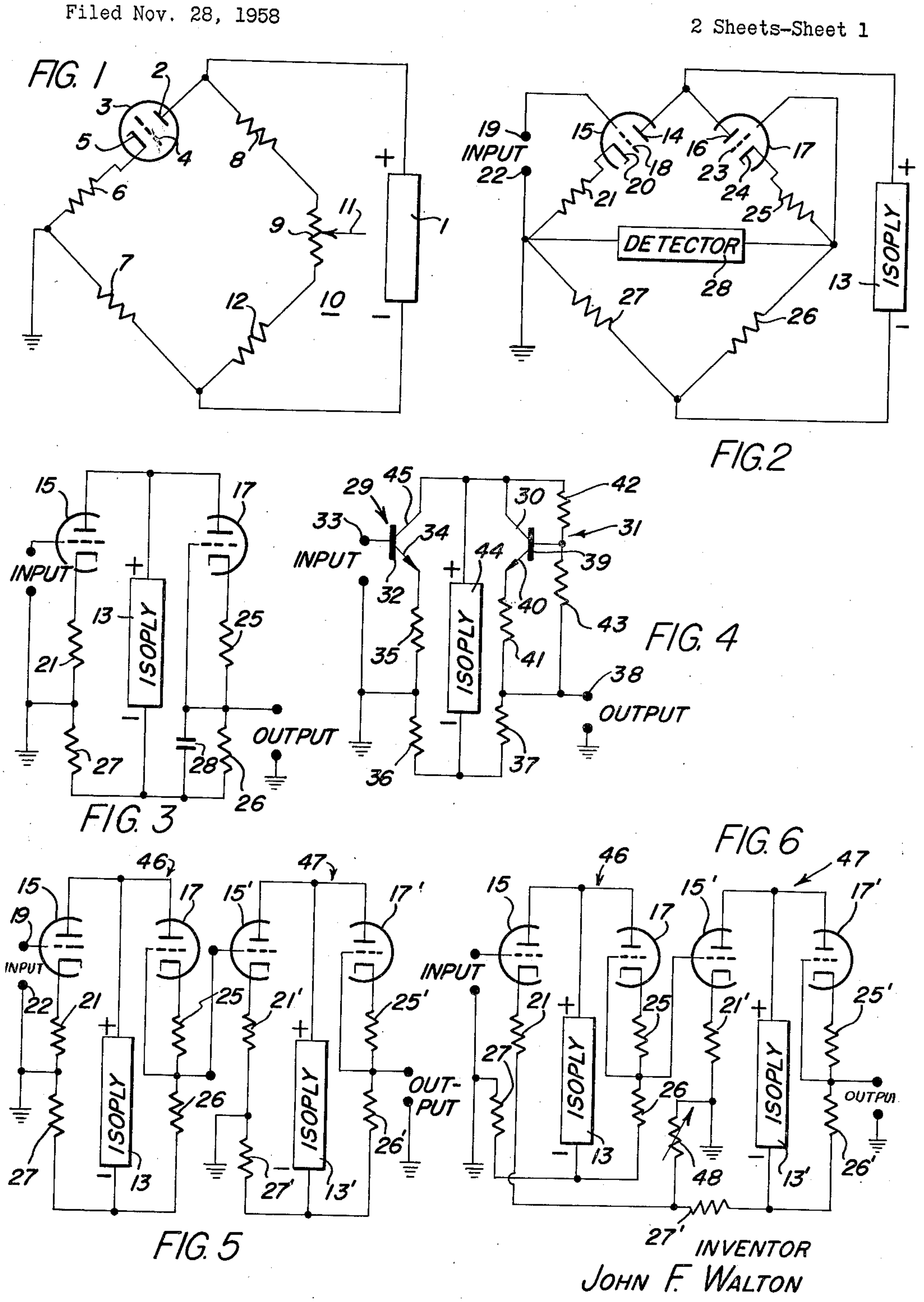

Referring specifically to FIGURE 1 of the accompanying drawings, a power supply 1 having a low shunt capacity to ground has its positive terminal connected to an anode 2 of a triode 3 having a control grid 4 and a cathode 5. The cathode 5 is connected to a reference potential such as ground through a cathode resistor 6, and a load resistor 7 is connected from ground to the negative terminal of the supply 1. The tube 3 and the resistors 6 and 7 constitute one leg of a bridge circuit.

The positive terminal of the supply 1 is also connected through a resistor 8 to a resistive element 9 of a potentiometer 10 having a movable tap 11. The negative terminal of the supply 1 is connected through a further resistor 12 to the lower end, as viewed in FIGURE 1, of the resistor 9 of the potentiometer 10. The resistances 8, 9 and 12 constitute the other or divider leg of the bridge circuit provided by the present invention.

In the absence of signal potentials, the values of the various resistive elements are chosen such that some point along the resistance 9 is at ground potential. The slider 11 may be placed at the point of zero potential on resistor 9, and in consequence no voltage is developed across the output terminals of the bride consisting of ground and the slider 11 of the potentiometer 10. Upon the application of a signal to the grid 4 of the tube 3, the impedance of the tube 3 is varied so that the bridge circuit becomes unbalanced and an amplified version of the signal appears at the tap 11 of the potentiometer 10. More particularly upon a signal being applied to the grid 4 of the tube 3 amplified signal currents flow through the left leg of the bridge causing the voltage at the lower end of the load impedance 7 to fluctuate in accordance with the input signal. This voltage appears at both the negative and positive terminals of the supply 1, since the supply is floating with respect to ground, and the signal is not attenuated by the voltage dividers comprising the resistors 8, 9 and 12. Therefore, the signal developed by the amplifying arm of the bridge appears unattenuated at the variable tap 11 of the potentiometer 10 while the D.C. component of the voltage on the tap 11 may be any value as determined by the position of the tap on the resistance 9. Several advantages arise from the utilization of the bridge circuit illustrated in FIGURE 1. These relate to the fact that the bridge is relatively insensitive to variations in voltage of the supply 1 and further that any bias voltage within reason is available at the tap 11 for a next succeeding stage of amplification.

The cathode resistor 6 may be eliminated from the circuit illustrated and so may be the resistors 8 and 12; in other words the one arm of the bridge may constitute the tube 3 alone, another arm may constitute the load resistor 7 and the two right-hand arms of the bridge may comprise the portions of the resistor 9 above and below the tap 11, respectively. The circuit illustrated in FIGURE 1 is preferable since it permits greater flexibility in design of the circuit.

The circuit illustrated in FIGURE 1 of the accompanying drawings, although constituting a considerable improvement over the prior art, is still quite sensitive to variations in the various parameters of the tube 3. Referring specifically to FIGURE 2 of the accompanying drawings there is illustrated a bridge circuit which is relatively insensitive to variations in various operating characteristics of the tube in the amplifying arm of the bridge. Referring now specifically to FIGURE 2, a power supply 13 has its positive terminal connected to an anode 14 of a triode 15, and an anode 16 of a triode 17. The triodes 15 and 17 are actually distinct halves of a dual triode employing a common cathode heater. The tube 15 further comprises a control grid 18, connected to an input terminal 19 of the circuit, and a cathode 20 connected through a cathode resistor 21 to a source of reference potential, which for purposes of example, may be ground potential. A second input terminal 22 of the circuit is also connected to ground potential.

The triode 17 further comprises a control grid 23 and a cathode 24 connected to one end of a cathode resistor 25. The other end of the cathode resistor 25 is connected through a balancing resistor 26 to the negative terminal of the power supply 13. The grounded end of the cathode resistor 21 of the tube 15 is further connected, through a load resistor 27 to the negative terminal of the power supply 13. A detector 28 has one end connected to ground potential and its other end connected to the junction of the resistors 25 and 26. The grid of the tube 17 is also connected to the junction of the resistors 25 and 26.

The tubes 15 and 17 preferably have substantially identical characteristics and the values of the resistors 21 and 25 are substantially identical, as are the values of the load resistor 27 and the balancing resistor 26. The values of the resistors 25 and 26 may be chosen such, with respect to the voltage of the supply 13 and the characteristics of the tube 17, that in the absence of a signal applied between the input terminals 19 and 22 the voltage at the junctions of the resistors 25 and 26 may be of any value, within limits set by the voltage available across source 13, but preferably is at zero potential (ground), for best cancellation of unwanted changes.

In the circuit described above, variations in the voltage of the supply voltage, when the bridge is balanced, does not cause a spurious output signal since in a balanced bridge, the value of the supply voltage to the bridge does not affect its balance condition. A further specific advantage of this circuit is that variations in the voltage applied to the common heater of the tubes' halves 15 and 17 are normally reflected almost equally in both halves of the dual tube, and balance of the bridge is thereby approximately maintained in spite of these variations.

Upon the application of a positive signal between input terminals 19 and 22, the voltage on the grid 18 of the tube 15 is increased and the current flowing through the tube 15, resistor 21 and resistor 27 is increased. As a result, the voltage at the negative terminal of the supply 13 becomes more negative with respect to ground. The voltage at the positive terminal of the supply 13 decreases with respect to ground by the same amount as the negative terminal since the power supply 13 is floating and the decrease in voltage at its negative terminal produces a corresponding decrease in voltage at its positive terminal. Since equal changes of voltage occur at both ends of the circuit comprising tube 17, resistor 25 and resistor 26, the signal appearing at the junction of the resistors 25 and 26 is not attenuated, although the latter circuit serves to maintain the bias of the junction of these latter two resistors at a desired potential.

Referring now to FIGURE 3 of the accompanying drawings, the circuit illustrated in FIGURE 2 is reproduced in more conventional form, that is, in a form which does not emphasize its bridge characteristics. Those elements which are common to FIGURES 2 and 3 carry the same reference numerals. The only difference in circuitry between the circuits of FIGURES 2 and 3 is the addition of a capacitor 28 connected in parallel with the resistor 26. The capacitor 28, whose value is not critical, serves to compensate the voltage divider for unavoidable capacitive loading at the output terminals of the bridge.

The circuit illustrated in FIGURE 2 and the substantially identical circuit illustrated in FIGURE 3 have nearly constant gain characteristics over a wide range of frequencies. The limiting factor in the frequency response of the circuit is the shunt capacity to ground of the supply 13, the stray wiring capacity and the input capacity to the circuit, the latter two factors being almost equal to the former. At frequencies of 15 megacycles per second the impedance of the aforementioned capacities has fallen to the order of magnitude of 1000 ohms. The various impedances of the circuit may be chosen such that the capacitive reactance of these capacities is still large relative to the remainder of the circuit at this frequency so that the response of the circuit is only slightly diminished at this point. However, at frequencies above 15 megacycles per second the shunting effect may become appreciable and result in signal degradation.

Referring now specifically to FIGURE 4 of the accompanying drawings there is illustrated a bridge-type D.C. amplifier circuit employing transistors rather than vacuum tubes. A power supply 44 has its opposite terminal connected to a collector 45 of an NPN transistor 29 and to a collector 30 of a further NPN transistor 31. The transistor 29 further includes a base 32 connected to an input terminal 33 adapted to receive input signals and an emitter 34 connected through an emitter resistor 35 to a source of reference potential, such as ground. The negative terminal of the supply 44 is connected through a load resistor 36 to ground potential and through a balancing resistor 37 to an output terminal 38. The transistor 31 further comprises a base electrode 39 and an emitter electrode 40 connected through an emitter resistor 41 to the output terminal 38. The base electrode 39 is connected through a resistor 42 to the positive terminal of supply 44 and through a resistor 43 connected to the output terminal 38. The resistors 42 and 43 serve as voltage dividing resistors to provide a proper bias current for the base of the transistor 31. The resistor 43 may be replaced by a Zener diode or a bias battery in which case engineering practice would require the addition of a resistor in series with the base of the transistor 31. The utilization of the Zener diode or bias supply reduces the temperature dependency of the circuit since the base voltage is no longer a function of collector-emitter voltage which is a temperature variable parameter.

Other than the requirement of the biasing resistors 42 and 43 in the circuit of FIGURE 4 of the operation of the circuit is substantially identical in all respects with that illustrated in FIGURE 2. The signals applied to the base 32 of the transistor 29 are amplified and appear at the negative and positive terminals of the power supply 44 and therefore appear across the voltage divider section of the bridge comprising transistor 31, emitter resistor 41 and balancing resistor 37. The voltage appearing at the output terminal 38 is a combination of the signal voltage developed across the load resistor 36 and a D.C. bias voltage which depends upon the relative impedances of the elements in the voltage divider leg of the bridge.

The circuit of FIGURE 4 serves the same general purposes as the circuit of FIGURE 2 in that the circuit is relatively insensitive to variations in the output voltage of the supply 44 and to variations in resistance of the transistors 29 and 31 as a result of changes in temperature and other ambient conditions. The circuit illustrated in FIGURE 4 is intended to demonstrate that transistors may be substituted for vacuum tubes in all of the circuits illustrated in the various figures of the present application.

Referring now to FIGURE 5 of the accompanying drawings, there is illustrated a cascaded amplifier employing two identical circuits of the type illustrated in FIGURE 1 of the accompanying drawings. The first stage of the amplifier which is designated by the reference numeral 46 bears the same reference characters as the corresponding elements of the circuit illustrated in FIGURE 2 whereas the second stage of the amplifier, which is designated by the reference numeral 47, carries the same reference numerals as the stage 46 but has primes added after each of the numbers to distinguish between the two circuits. As in the circuit illustrated in FIGURE 2 input signals applied between the input terminals 19 and 22 are amplified by the triode 15. The signal currents flowing through the tube 15 produce signal voltages at the negative and positive terminals of the power supply 13 which appear unattenuated at the junction of the resistors 25 and 26. The signal appearing at the junction of these latter two resistors, as previously indicated, is directly coupled to an input terminal 19′ of the second stage 47 of the cascaded amplifier as illustrated in FIGURE 5. The direct connection of the junction of the resistors 25 and 26 to the input terminal 19′ in the second stage 47 of the amplifier is possible because the voltage at the junction of resistors 25 and 26 is at ground potential or other desired bias potential required to maintain proper bias on the tube 15′. As in the case of first stage 46, the signal voltage applied to the second stage 47 is amplified by tube 15′ and appears unattenuated at the junction of the resistors 25′ and 26′. Numerous stages of the amplifier of the invention may be cascaded and each stage may be directly connected to the grid of the input tube of the next succeeding stage.

The cascaded amplifier illustrated in FIGURE 5 may be readily provided with an interstage negative feedback path and the specific circuit connections for producing negative feedback from a second to a first cascaded stage are illustrated in FIGURE 6 of the drawings. Those elements of FIGURE 6 which correspond to elements in FIGURE 5 bear the same reference numerals as those elements in the latter figure. In the circuit illustrated in FIGURE 6 the cathode resistor 21 is connected to ground through a fixed or variable resistor 48 rather than being connected directly to ground as in the circuit of FIGURE 5. The load resistor 27′ of the second stage 47 of the amplifier illustrated in FIGURE 6 is connected between the negative voltage terminal of the power supply 13′ and the ungrounded end of the feedback resistor 48. Other than this the circuit of the stage 47 of the amplifier is identical with the circuit of the stage 47 illustrated in FIGURE 5.

The resistor 48 is common to the cathode circuit of the tube 15 and to the anode circuit of the tube 15′ in the stages 46 and 47, respectively. The stages 46 and 47 are identical in all respects and therefore in the absence of a signal current, the currents in the tubes 15 and 15′ are equal so that the two currents in the resistance 48 as a result of its being connected in both of the aforesaid circuits are equal. However, the current in the resistance 48 as a result of its connection in stage 46 of the amplifier is in the opposite direction from the current therethrough as a result of its being connected in the stage 47 of the amplifier. Therefore, the net quiescent current is zero and the net direct voltage across the resistance 48 is zero. Upon the application of a signal voltage to the input terminals 19 and 22, the signal current in the resistance 48, due to the amplification of the signal in the stage 47 of the amplifier, is greater, by the amplification factor of this stage, than the current flowing therethrough as a result of its connection in its stage 46 of the amplifier. In consequence, a net signal voltage is developed at the junction of the resistors 21, 27′ and 48 and is of such a sense as to constitute a negative feedback voltage with respect to the tube 15. The amount of negative feedback may be controlled by varying the resistance of the resistor 48.

Figure 7:
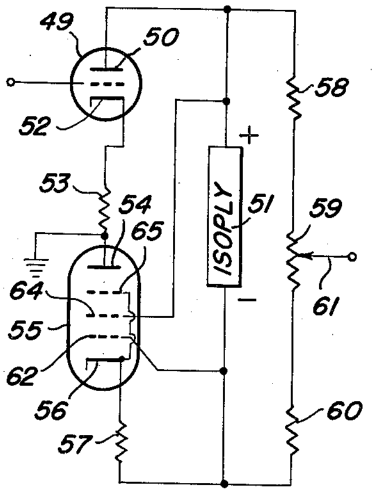
FIGURES 7 and 8 are schematic wiring diagrams of two different constant current bridge circuits employing the concepts of the present invention.

Referring specifically to FIGURE 7 of the accompanying drawings there is illustrated still another embodiment of the bridge circuit of the present invention. A triode 49 has its anode 50 connected to the positive terminal of a power supply 51 and has its cathode 52 connected through a cathode resistor 53 to a grounded anode 54 of a pentode 55. The pentode 55 has a cathode 56 connected through a cathode resistor 57 to a negative terminal of the power supply 51. The power supply 51 is shunted by a series circuit comprising, in the following order, resistors 58, 59 and 60. The resistor 59 has a variable tap 61 adapted to move across its surface. The pentode 55 has a control grid 62 connected to the negative terminal of the supply 51 and has a screen grid 64 connected directly to the positive terminal of the supply 51. A suppressor grid 65 may be connected to the cathode 56 of the tube 55.

The pentode 55 is a constant current device which tends to maintain a constant current in the left leg of the bridge of the circuit illustrated in FIGURE 7. The constant current operation of the pentode is further enhanced by the cathode resistor 57 which operates as a negative feedback resistor that varies the tube bias in a sense which tends to diminish variations in current through the tube 55. It will be noted that the right leg of the bridge of FIGURE 7 comprises a plurality of fixed resistors and the current through this arm of the bridge is substantially constant. Therefore, a substantially constant current drain is imposed on the supply 51 thereby minimizing fluctuation in the output voltage of the supply due to variations in current through the internal impedance of the source. A further advantage of the circuit of FIGURE 7 is that since a substantially constant current passes through the triode 49, its amplification is linear and the output signal is directly proportional to the input signal over a substantial range of signal amplitudes.

Figure 8:
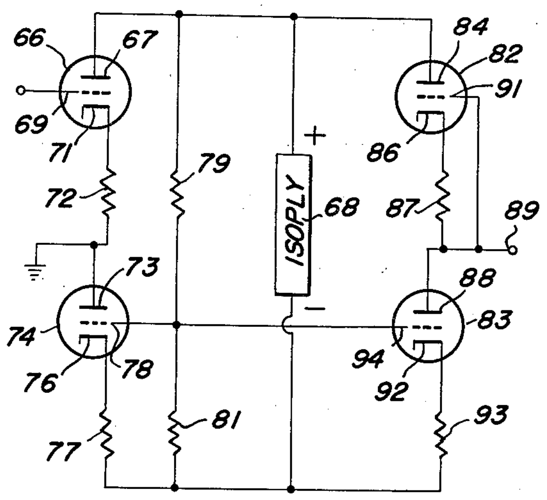

It is apparent from the preceding figures of the present invention, that the resistor 58 may be replaced by a cathode-loaded triode and similarly the resistance 60 may be replaced by a cathode-loaded pentode. In this event constant current operation of both arms of the bridge is maintained and in addition compensation for temperature changes, heater changes, and changes in emission characteristics are achieved. Such a circuit, employing triodes with voltage feedback to replace the pentodes, is illustrated in FIGURE 8 of the accompanying drawings. A triode 66 has an anode 67 connected to the positive terminal of a power supply 68 and has a control grid 69 adapted to receive input signals. The tube 66 also includes a cathode 71 connected through a resistor 72 to the anode 73 of the triode 74. The anode of the triode 74 is grounded while the cathode 76 is connected through a relatively large cathode resistor 77 to the negative terminal of the supply 68. The tube 74 further includes a control grid 78 connected to the junction of resistors 79 and 81 which are connected in series across the supply 68. The tubes 66 and 74 constitute the signal arm of a bridge circuit while the voltage divider arm includes triodes 82 and 83. The triode 82 has an anode 84 connected to the positive terminal of the supply 68 and a cathode 86 connected through a cathode resistor 87 to an anode 88 of the triode 83. The anode 88 is connected to an output terminal 89 and is also connected to a control grid 91 of the triode 82. The triode 83 is provided with a cathode 92 connected through a relatively large cathode resistor 93 to the negative terminal of the supply 68 and also includes a control grid 94 connected to the junction of the resistors 79 and 81.

In this circuit the bias for the tubes 74 and 83 is derived from the voltage divider comprising resistor 79 and 81 while the constant current operation is achieved by means of the large cathode resistors 77 and 93 which provide for cathode degeneration. The circuit is substantially completely temperature insensitive due to the fact that all elements of the circuit are subjected to similar temperature effects and in order to enhance this attribute of the circuit, the tubes 66 and 82 may constitute the two halves of a dual triode while the tubes 74 and 83 likewise may constitute the two halves of a dual triode.

Figure 9:
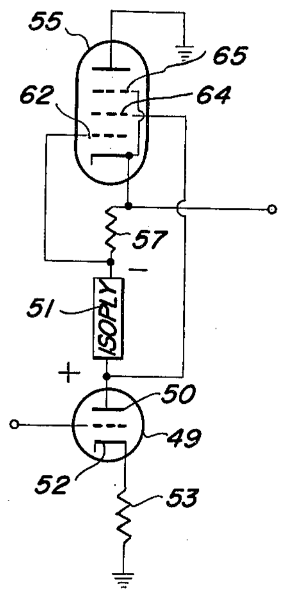
FIGURE 9 is a schematic wiring diagram of a subcombination of the circuit of FIGURE7.

The basic circuits of FIGURES 7 and 8, that is, the portion of the circuit representing the left hand arm of the bridges are stacked amplifier arrangements and the circuit of FIGURE 7 has been rearranged in FIGURE 9 with the elimination of resistors 58, 59 and 60 to more clearly illustrate the basic amplifier structure. It will be noted that reference numerals referring to similar circuit elements in FIGURES 7 and 9 are assigned the same reference numerals. In FIGURE 9 the input signal is supplied to the control grid of the tube 49 and the signal developed at the anode of the tube is applied to the screen 64 of the pentode 55 while the signal developed at the junction of the supply 51 and the resistor 57 is applied to the control grid 62 of the tube 55. Since the screen grid 64 is connected to the anode 50 of the tube 49, it floats with the cathode and control grid of the tube 55 and therefore materially reduces the interelectrode capacity of the tube. Also, a proper bias is applied to the screen grid 64 as a result of its connecttion to the positive terminal of the supply 51 while the cathode and grid of the tube 55 are connected to the negative terminal of the supply. Further, since the cathode and control grid of the tube 55 are connected to the negative terminal of the supply 51, these elements are at a negative potential with respect to ground and the anode of the tube may be connected directly to ground. As a result of this arrangement, a single power supply 51 provides the anode voltage for both tubes 49 and 55 and the screen grid voltage for the tube 55 thereby materially reducing the number of power supplies which must be utilized in conventional circuits of this type or eliminating complex circuit arrangements which permit the utilization of a single power supply. Other advantages of the basic circuit illustrated in FIGURE 9 are that the gain of the amplifier equals the mu of the triode and distortion is substantially lower than in the conventional triode or pentode amplifier. The reason for this latter feature is that the pentode 55, being a constant current device, maintains the current through the triode substantially constant and as a result the load line of the triode, when applied to the plate current versus plate voltage curve the tube, is a straight horizontal line which intersects the plate characteristic curves at equally spaced points along its length. As a result equal changes in grid voltage, regardless of the basic or absolute value of a voltage, produces equal changes in plate current of the tube. Other advantages of the circuit are that no signal degeneration occurs across the cathode bias resistor of the triode since the plate current is nearly constant, decoupling from other circuits is essentially complete, this being also a function of the constant current draw of the tube 55 and finally the signal output voltage is high compared to conventional amplifiers with the same supply voltage.

Figure 10:
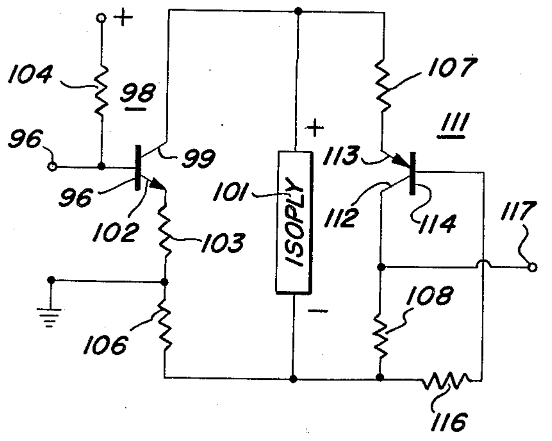
FIGURE 10 is a schematic wiring diagram of a transistorized bridge amplifier employing complementary symmetry.

Referring specifically to FIGURE 10 of the accompanying drawing, there is illustrated a transistor bridge amplifier employing complementary symmetry. An input terminal 96 is connected to a base electrode 97 of an NPN transistor 98 having a collector electrode 99 connected to a positive terminal of a floating power supply 101. The transistor 98 is also provided with an emitter electrode 102 connected through an emitter resistor 103 to ground. Ground also serves as the record input terminal and the other input terminal 96 is connected through a base resistor 104 to a positive potential to supply a base voltage to the transistor 98. A load resistor 106 is connected between ground and the negative terminal of supply 101 and the resistors 103 and 106 and transistor 98 constitute the signal arm of the bridge.

A compensating arm of the bridge includes a resistor 107, a resistor 108 and a PNP transistor 101 connected between the two resistors. Transistor 111 has a collector electrode 112 connected through resistor 108 to the negative terminal of supply 101 and an emitter electrode 113 connected through resistor 107 to the positive terminal of supply 101. The transistor 111 has a base electrode 114 connected through a high impedance 116 to the negative terminal of supply 101. Collector electrode 117 is connected to an output terminal 117.

In operation signal currents applied between terminal 96 and ground are amplified by transistor 98 and appear across load resistor 106. These signals appear unattenuated at output terminal 117 and therefore the operation of the amplifying function of the bridge is the same as the circuit illustrated in FIGURE 4 of the drawings. However, the compensating arm of the bridge is more temperature sensitive than the corresponding arm in FIGURE 4. In FIGURE 4 variations in temperature produce variations in the emitter-to-collector resistance of transistor 31 and therefore in the emitter-to-collector resistance of transistor 31 and therefore in the emitter-to-collector voltage. Since the base voltage is derived by means of a voltage divider 42—43 from the emitter-to-collector current, the base voltage is affected substantially by temperature. A corresponding function is not found in the signal arm of the bridge since the base voltage is derived from the preceding voltage of amplification which may or may not be temperature sensitive and if temperature sensitive may produce a cumulative rather than compensating effect.

In the circuit of FIGURE 8, the base voltage is derived from the negative terminal of the supply 101 through the resistor 116 which has a high impedance relative to the base impedance of the transistor 111. In consequence, the base current is not sensitive to changes in emitter-to-collector resistance of the transistor and also is relatively insensitive to variation in base resistance with temperature since the base resistance is small compared to the resistance of resistor 116. Changes in resistance due to temperature are now equally reflected in both arms of the bridge since the only significant changes occur in the series emitter-to-collector resistance which appears in both arms.

While I have described and illustrated several embodiments of my invention, it will be clear that variations of the details of construction which are specifically illustrated and described may be resorted to without departing from the true spirit and scope of the invention as defined in the appended claims.

What is claimed is:

1. A signal amplifier comprising two parallel circuits, an amplifying element having a common electrode, a further electrode and a control electrode for controlling the flow of charge between the other of said electrodes, at least one impedance having two end terminals, means connecting one of said end terminals of said impedance to said common electrode of said amplifying element in one of said two parallel circuits, means connecting a voltage source in series with said amplifying element and said impedance with one end of said source connected to the other end terminal of said impedance, means for connecting said one end terminal of said impedance to a reference potential, means connecting said other parallel circuit across the voltage source, a voltage divider connected in said other parallel circuit, and an output means connected to a predeterminable voltage point along said voltage divider and to the reference potential, and means for coupling an input signal to said control electrode.

2. The combination according to claim 1 wherein said amplifying element comprises an electron tube having a grid as the control electrode, a cathode as the common electrode and an anode as the further electrode.

3. The combination according to claim 1 wherein said amplifying element comprises a transistor having an emitter electrode as the common electrode, a base electrode as the control electrode and a collector electrode as the further electrode.

4. A signal amplifier comprising an amplifying element having a common electrode, a further electrode and a control electrode for controlling the flow of charge between the other of said electrodes, an impedance having two end terminals, first means connecting one end terminal of said impedance to said common electrode, second means connecting said one end terminal to a reference potential, means connecting a voltage source across said amplifying element and said impedance in series, means for connecting a voltage divider across the voltage source, an output lead and means for coupling said output lead to a predeterminable voltage along said voltage divider and to the reference potential, and means for coupling an input signal to said control electrode.

5. The combination in accordance with claim 4, wherein said impedance comprises a vacuum tube.

6. A signal amplifier comprising two parallel circuits, a first and a second amplifying element each having a common electrode, another electrode, a first and a second impedance and a first and a second further impedance, means connecting said first amplifying element and said first impedances in series circuit in one of said parallel circuits with said first further impedance connected between said first impedance and said common electrode of said first amplifying element, means connecting said second amplifying element and said second impedances in series circuit in the other of said parallel circuits with said second further impedance connected between said second and said common electrode of said second amplifying element, means connecting said control electrode of said second amplifying device to the end of said second impedance remote from said common electrode of said second element, means for connecting a voltage source across said both of said parallel circuits and means for connecting the end of said first further impedance remote from said common electrode of said first amplifying element to a reference potential and means for coupling an input signal to said control electrode of said first amplifying element.

7. An amplifier comprising two parallel circuits, a first vacuum tube having an anode a control electrode and a cathode, a first cathode impedance and a load impedance, said tube and said impedances being connected in series circuit in one of said parallel circuits with said impedances being directly connected to each other, a second vacuum tube having an anode, a cathode and a control electrode, a second cathode impedance and a balancing impedance, said second tube, said balancing impedance and said second impedance being connected in series circuit in the other of said parallel circuits with said impedances being contiguous, means connecting said control electrode of said second vacuum tube to the end of said second cathode impedance remote from said cathode of said second tube means connecting a voltage source across both of said parallel circuits and means for connecting the end of said first cathode impedance remote from said cathode to a reference potential and means for coupling an input signal to said control electrode of said first vacuum tube.

8. A signal amplifier comprising a transistor having a control electrode, a common electrode and a collector electrode, at least one impedance having two end terminals, means connecting said transistor and said impedance in series circuit, means connecting one end terminal of said impedance to said common electrode, means connecting said one end terminal to a reference potential, means for connecting a voltage source across said series circuit and to the other end terminal of said impedance, a voltage divider connected across the voltage source and an output means coupled to a predeterminable voltage along said divider and to the reference potential, and means for coupling an input signal to said control electrode.

9. The combination in accordance with claim 8 wherein said voltage divider includes a transistor.

10. The combination in accordance with claim 9 wherein said transistors are of opposite conductivity types.

11. A signal amplifier comprising a tube having a cathode and an anode, at least one impedance having two end terminals, said tube and said impedance being connected in a series circuit, means connecting said one terminal to said cathode, means for connecting said one terminal to a reference potential, means for connecting a voltage source across said series circuit with one end of the source connected to the other terminal of said impedance, a voltage divider connected across the voltage source and an output means coupled to a predeterminable voltage along said divider and to the reference potential, and means for coupling an input signal to said control electrode.

12. A cascaded signal amplifier having at least a first and a second amplifier stage each of which comprises an amplifying element having a common electrode, a further electrode and a control electrode for controlling the flow of charge between the other of said electrodes, an impedance having two end terminals, first means connecting one end terminal of said impedance to said common electrode, second means connecting said one end terminal to a reference potential, means connecting a voltage source across said element and said impedance in series, means for connecting a voltage divider across the voltage source, an output lead and means for coupling said output lead to a predeterminable voltage along said voltage divider, means connecting said output lead of said first stage to said control electrode of said second stage, and a further impedance, said first means of said first stage including at least part of said further impedance and said second means of said second stage including at least part of said further impedance and means for coupling an input signal to said control electrode of said first stage.

13. A signal amplifier comprising a triode having a cathode, a control electrode and an anode and a pentode having a control grid, a screen grid, a cathode and an anode, a low capacity power supply having a positive and a negative terminal, said anode of said pentode being connected to a reference potential, means connecting said cathode of said triode to the reference potential, said anode of said triode being connected to said positive terminal, resistor means connecting said cathode of said pentode to said negative terminal, and means connecting said screen grid to said positive terminal and means for coupling an input signal to said control electrode of said triode.

14. The combination in accordance with claim 13 further comprising a voltage divider connected across said power supply.

15. A signal amplifier comprising two parallel circuits, an amplifying element having a common electrode, an output electrode and a control electrode for controlling the flow of charge between said other electrodes, at least one impedance having two end terminals, means connecting said impedance in series with said amplifying element in one of said parallel circuits, means connecting a voltage source across said one of said parallel circuits with one end of said source connected to one end terminal of said impedance, means for connecting the other end terminal of said impedance to a source of reference potential, means connecting said other parallel circuit across the voltage source, a voltage divider connected in said other parallel circuit, and an output means connected to a predeterminable voltage point along said voltage divider and to the reference potential, and means for coupling an input signal to said control electrode.

16. A signal amplifier comprising a pair of amplifying elements, means for connecting said amplifying elements in series circuit across a voltage source having a low capacity to ground, means for connecting said series circuit to a source of reference potential at a location between said elements and such that one of said elements is interposed between said location and said voltage source, a voltage divider, means for connecting said voltage divider across said source, means for deriving an output voltage from a point along said voltage divider, means for applying an operating bias to said amplifying elements and means for coupling an input signal to said one of said amplifying elements.

17. The combination according to claim 16 wherein said voltage divider comprises a pair of amplifying elements connected in series.

18. A cascaded, direct-coupled amplifier comprising a first and a second amplifier stage each including an amplifier element having a common electrode, a further electrode and a control electrode for controlling the flow of charge between the other of said electrodes, a common electrode impedance and a further electrode impedance, means for connecting a different power supply between each of said further electrodes and a distinct output lead for each of said amplifier stages, a direct current coupling means connecting each of said output leads to a different one of said further electrode impedances, means for each of said stages, said direct current coupling means connecting said output lead of said first stage to said control electrode of said amplifying device of said second stage, said common electrode impedance of said first stage and said further electrode impedance of said second stage including a common impedance, said common impedance having an end remote from said common electrode of said first stage and from said further electrode of said second stage connected to a reference potential, and means connecting the reference potential to the end of said further electrode impedance of said first stage remote from said further electrode and to the end of the common electrode impedance of said second stage remote from said common electrode and means for coupling an input signal to said control electrode of said first stage.

19. The combination according to claim 18 wherein said direct current coupling means includes means for connecting a voltage divider across said power supply.

20. The combination according to claim 19 wherein said voltage divider includes at least one voltage controllable impedance.

21. A signal amplifier comprising first and second parallel circuits each including a transistor having a control element, and a pair of impedances said transistor and said impedances being connected in series, means connecting said parallel circuits across a voltage source, said impedances in said first circuit being connected in series between said transistor and the voltage source, means connecting the junction of said impedances to a source of reference potential, means for applying signals generated in said first circuit to said control element of said transistor of said second circuit, means for deriving an output voltage from said second circuit and means for coupling an input signal to said control element of said first circuit.

22. The combination according to claim 21 wherein said transistors are of opposite conductivity types.

References Cited in the file of this patent

UNITED STATES PATENTS

| | | |
|---|---|---|
| Re. 23,563 | Barney | Oct. 14, 1952 |
| 1,856,373 | Burton | May 3, 1932 |
| 2,310,342 | Artzt | Feb. 9, 1943 |
| 2,517,863 | Froman | Aug. 8, 1950 |
| 2,549,833 | Martinez | Apr. 24, 1951 |